United States Patent [19]

Gurgui et al.

[11] 4,022,650

[45] May 10, 1977

[54] APPARATUS FOR PRODUCING A DECORATIVE BUILDING MATERIAL

[75] Inventors: Constantin Gurgui; Vasile Luca; Andrei Eckardt; Paraschiv Ciulacu, all of Bucharest, Romania

[73] Assignee: Intreprinderea "Bucuresti" Pentru Extragerea, Prelucrarea si Montarea Marmurei si Pietrei de Constructii, Bucharest, Romania

[22] Filed: Aug. 25, 1975

[21] Appl. No.: 607,608

Related U.S. Application Data

[62] Division of Ser. No. 221,467, Jan. 27, 1972, Pat. No. 3,930,088, which is a division of Ser. No. 791,405, Jan. 15, 1969, Pat. No. 3,705,830.

[30] Foreign Application Priority Data

Jan. 24, 1968 Romania .............................. 55669

[52] U.S. Cl. ................................ 156/498; 156/499

[51] Int. Cl.$^2$ .................. B32B 31/12; B32B 31/14; B32B 35/00

[58] Field of Search .............. 156/71, 72, 279, 298, 156/243, 382, 390, 242, 498, 538, 499; 428/143, 237, 240, 323

[56] References Cited

UNITED STATES PATENTS

| | | | |
|---|---|---|---|
| 1,345,922 | 7/1920 | Goldberg | 156/279 |
| 2,663,663 | 12/1953 | Weltman et al. | 156/279 |
| 2,949,689 | 8/1960 | Vida | 156/71 |
| 3,056,224 | 10/1962 | Almy et al. | 156/71 |
| 3,573,131 | 3/1971 | Rudloff | 156/71 |
| 3,787,277 | 1/1974 | Oomen et al. | 156/279 |

*Primary Examiner*—Caleb Weston
*Attorney, Agent, or Firm*—Karl F. Ross; Herbert Dubno

[57] ABSTRACT

An apparatus for producing decorative building material of the type in which granules of rock are bonded to a supporting net with a synthetic-resin binder, comprises a device for dipping a web of the net in a vat of the priming liquid which can consist of an aqueous dispersion or solution of the polymer containing powder of the granules. The priming coating is squeezed out and the granules are deposited on a conveyor, whereupon a spray head deposits the synthetic resin upon the granule-coated net. The latter is then passed through a drying tunnel on a conveyor through which the web is heated by gas-fired infrared heaters and the web is then compressed between rollers and cooled.

3 Claims, 6 Drawing Figures

APPARATUS FOR PRODUCING A DECORATIVE BUILDING MATERIAL

CROSS-REFERENCE TO RELATED APPLICATION

This is a division of application Ser. No. 221,467 (U.S. Pat. No. 3,930,088) which was a division of Ser. No. 791,405, filed Jan. 15, 1969, now U.S. Pat. No. 3,705,830.

FIELD OF THE INVENTION

The invention concerns a prefabricated material for the finishing and the decoration of the buildings as well as a process and an installation for its manufacture.

BACKGROUND OF THE INVENTION

For the purpose of finishing and decorating the buildings, tapestry has been suggested which, unlike the old tapestry of paper or textile material, consists of a support of paper or conventional textile material covered by a decorative layer applied in the form of a paste. The paste consists of various binders and filling material, made of natural or artificial matter, ground to a fine grain size or to dust and applied by means of simple rakes or of special rushes. Due to the dusty character of the filler, these layers have not succeeded in assuming the decorative aspect of the natural materials, from which the dusty filler was derived. That is why recently, prefabricated finishing materials in the shape of flexible foils and plates have been proposed, these comprising a support of textiles or of glass felt, covered by a layer of plaster made of a binder of synthetic resins and small or greater granules, arranged in narrow dimensional ranges, applied mechanically. To fix the foil, the back side of the support is covered with a layer of "fillerized" binder, which is attached to the components of the building by means of a cement mortar, with an addition of binders of polymers, emulsifiable in water. The face layer of the sheet of material is opacified, and does not show clearly the grains; the structure and the optical aspect of the natural materials employed for the paste are greatly modified. Moreover, the paste or the mortar require large quantities of binder, thereby making for high prices.

During the last two decades many other prefabricated dry materials have been suggested for the finishing and decoration of buildings. Material consisting of one sheet of elastomer, with expanding additives, covered by a wear-out layer of rubber, colored or possibly offset, treated in a furnace for the purpose of expanding or of vulcanizing the wear-out layer, which is a material of poor decorative effect and may be practically employed only for flooring. In a similar material, the lower layer consists of expanded plastics. Another material suggested applies on a bearing layer made of jute or sewn felt, a layer of expanded polyvinyl chloride, and over it a thin wear-out layer of polyvinyl chloride, colored or slightly embossed. All these materials, which may used indoors, especially for flooring, consist essentially of plastics and keep the artificial aspects of the latter.

Instead of the old and new types of mosaic for floors and walls, manufactured manually, at high costs, from bigger or smaller flat parts (the so-called "Kleinmosaik"), assembled by means of wet mortar, finishings and decorations made of mosaic foils, have been suggested, with small bits of artificial stones, glass, metal, ceramics, plastics, prefabricated foils, flexible and dry. They consist of a layer of flat components of the same knid, color, etc., or different, fixed together by filling the space between them and by means of a connecting layer made of the thermoplastic polymers, attached to a support of asbestos felt, impregnated with thermoplastic polymer, plastified and fillerized. For fastening, thermoplastic polymers and copolymers of polyvinyl chloride are employed, as well as mixtures of the above, the impregnation is preformed with acrylic polymer with additives.

A material suggested for finishing and for decoration, as an artificial stone, consists of a relatively thin support-sheet of non-solidified synthetic resin, into which greater granules (bits) of crushed rock are partially thrust; the support is then solidified and fixes the granules, which are ground with flat facettes, partially, or down to the support level; in one version, the spaces between the great thrusted granules are filled with smaller granules, in the shape of a paste with binder of synthetic resin or an inorganic one, the whole surface being then ground, flat or corrugated, after solidification; in another version, the support is translucent, of adequate thickness and has larger granules thrusted in it so that the foil may be applied with either face towards the support, the granules being visible, either directly or by transparence. The foils keep the aspect of artificial material, deriving from the visible support or plastic binder, and are rather expensive, due both to the prime materials and the high production costs.

OBJECT OF THE INVENTION

The present invention is to provide a new material for the finishing and the decoration of buildings, which eliminates the drawbacks of known materials for this purpose, and a process and an installation adequate for producing this material.

SUMMARY OF THE INVENTION

The material for the finishing and the decoration of buildings, according to the invention, is ready finished veneer, having the appearance of a split natural crystalline stone, or else a similar appearance, in the shape of flexible, prefabricated foils, and consists of an upper layer, screening the further layers, made of a sheet of hard granules, of rock or artificial stone, a binder of synthetic resins connecting the granules of the sheet to each other, being still invisible, as well as of a bottom layer, in the shape of a net, the meshes of which are traversed by the points of the hard granules, so that the foil of material may be applied with the back directly to the components of the building, and being able to adhere directly and to be interpenetrated by the usual binders, eventually with the help of additives. The binders are, of preference, cement-mortar, cement and lime mortar plain or with additives, as for instance synthetic resins, which may be dispersed in water.

As hard granules, bits of rock, in random sizes or crushed, raw or polished, are employed, being sorted in ranges of adequate size of 0.5 – 5 mm, the dust being removed by washing.

Granules, generally resistant to atmospheric agents, are employed, consisting for instance of the following:

crystalline sedimentary-metamorphic rocks, such as marble or alabaster, white or else naturally or artificially, colored, gneiss, various shales, quartzites and the like;

eruptive volcanic rocks, such as granites, porphyry, sienites, feldspars, quartz, jasper, silex, tuff, trachytes and the like.

Adequate granules of any convenient artificial materials may be employed, such as silicon carbide, glass granules, transparent or opaque, colorless or colored, as inorganic materials; equally, granules of hard plastics, such as polystyrene, polyvinyl chloride, acrylates, etc., preferably colored and opacified As mentioned, the face layer, consisting of granules, masks completely all that is behind it, that is the supporting net and the binder for applying the material to the components of the building. This is achieved by composing the face layer of more than one single layer of granules, i.e. up to 2 – 3 layers.

The ranges of granules used in the successive layers may be relatively narrow, such as 1 – 2; 2 – 3; 3 – 4 mm, or else larger, such as 0.5 – 2; 1 – 4; 1.5 – 5mm; possibly, the proportion of the various ranges may be fixed, according to the decorative effect pursued.

It is obvious that, for the same decorative purpose, the granules constituting the layer may be of the same kind, or else of various kinds, of the same color, or of various colors, conveniently moxed beforehand and distributed in the same manner in constituting the layer, or else distributed unmixed, according to a predetermined geometry.

The practically invisible binder, which connects the granules to each other and to the supporting net, is applied so as to cover with pellicles the whole surface of the layer granules, and to connect them to each other in the nonexposed contact zones, as well as to the supporting net. The apparent layer thus becomes a "conglomerate" of granules, practically invisibly bound, which keeps the appearance and the natural contours of the granules, the natural stone appearance of the foil, in the case of granules from rocks, or else a similar aspect, in the case of granules consisting of artificial materials.

Hardened synthetic resins are employed as the binder, to which both the granules and the supporting net adhere, as well as current binders for applying the foils to the components of the building, of preference cement mortar, alone or mixed with lime and with binders of of synthetic resins, as additives.

On the other hand, the hardened synthetic resins, used as binders may be thermoplastic, in order to correspond to the process of manufacturing the material, as described further below.

As synthetic resins, corresponding to these conditions, vinylic polymers and copolymers are used of preference, such as polyvinyl acetates acrylic polymers, such as methyl polymethacrylate, epoxidic polymers, in the form of aqueous dispersions, ensuring a better adhesion, with mineral supports, or in solutions in one or more solvents which are cheap, non-inflammable, nontoxic.

These synthetic resins are employed unfillerized and uncolored, so that they supply transparent, colorless films, which are invisible in the granule layer, even in deeper layers.

It was further ascertained that the pellicles resulting from the binder and the above synthetic resins — used in the shape of dispersions — are sufficiently water resistant. They swell slightly, but when dried, recover the initial resistance.

In order to avoid the alteration of the face layer, by water spraying and repeatedly drying afterwards, the layer is rendered water-repellant by spraying with a solution of the same polymer, or of another perfectly adhering to it. This operation may be performed during the manufacture of the material, or else after applying it to the components of the building.

The supporting net, which constitutes the back face of the foil is necessary during the manufacturing process, as well as during the manipulation and the application of the foil. Thus, the meshes of the net must be of such dimensions, that their area should represent at least 70 – 80% of the total area, while their stable dimensions should not exceed about 70 – 80% of the lower dimensional limits of the hard granules employed.

Thus, the supporting net is able to bear the granules spread over it, part of which penetrate with their spikes, in the meshes, a fact which helps in making the material firmly adherent to the components of the building.

Net-shaped supports made of textile materials may be employed, such as knitting with constant-size meshes; for the sake of adhesion, and against a possible decay, these textile supports are bibulous and impregnated with aqueous dispersions of the synthetic resin, or else with the synthetic resin solution employed as a binder. For the same purpose, the emulsion of the solution is fillerized by means of dust below 0.5 mm of a material constituting the hard granules employed.

Supports of steel-wire screen may equally be employed, the wire being protected by zinc plating or by varnishing with plastics. Glass felt may also be used, of large meshes, together with unwoven-fiber mats, like that used for reinforcing the plastics plates for roofs.

The support may be used in the shape of endless, or nearly endless, broad strips, a fact which constitutes an advantage, both in the manufacturing process, and in manipulation and positioning.

Thus, a foil and decorative material according to the invention may have a length of, for instance, 5–20 m.

Due to its structure, the foil of material is sufficiently flexible to be wrapped around rolls of 10 – 15 cm diameter, a fact which largely ensures the possibility to transport the rolls, to unfold them for the purpose of applying the foil in the shape of long strips on the components of the building, either in the manufacturing width or as a strip of smaller width cut out of the whole width.

It is of course possible to apply the material according to the invention in the form of plates of regular geometric shapes, square, etc., cut out of the foil and, namely, plates of the same structure and color or else different, corresponding to the decorative needs. For such purposes, the material may of course be inflexible.

The firm adhesion of the material in the shape of foils or plates to the components of the building is favored by the roughness and the greater area of the granule corners which penetrate through the meshes of the support as compared to the small area of the support itself in contact with the adhesive mortar employed for the application; another factor favoring the adhesion is the foil structure which allows the binder to penetrate between the granules of the sheet.

A formula for the adhesive mortar with additives, which may be employed for this purpose, is the following:

cement of high initial resistance (fast setting strength) 1.5 parts;

fine, dry sand of 0 – 0.2 mm grain size 2 parts; lime paste 50%, the balance being water, 0.10 parts;

solid calcium chloride 0.01 parts;

mineral dye of the hard-granules color 0.03 parts;

polyvinyl acetate in 50% water dispersion, 0.15 parts;

water up to 0.5 parts (all parts by weight).

Finally the material applied to the components of the building (walls, ceilings or especially floors) may be covered by a transparent layer, for smoothing out and for wear, consisting of a suitable synthetic resin. Such a layer may be applied by means of casting spatual-using smoothing out doctoring processes, or by other processes.

The manufacturing process of the buildings finishing and decorating material according to the invention is, of preference, continuous, the supporting net being in horizontal motion and consisting of the following operations:

the baiting or the priming of the supporting net, if the latter is of textile fibers, by drawing it through a bath of thermoplastic synthetic resin, a bath of an aqueous dispersion of the resin or a solution of the resin to which is added finely ground filler of the granules material, the excess of synthetic resin dispersion or solutions being removed by squeezing out the supporting net;

spreading a layer of previously washed and dried hard granules on the impregnated supporting net, the layer being of a uniform thickness according to the grain size; the layer is spread by free dosed flow of the granules, immediately followed by a slight pressing of the face layer for the purpose of setting the granules and of slightly smoothing the surface; the layer is 1 – 7 mm thick which represents 1.5 – 2.5 times the average size of the hard granules employed;

binding the granules to each other and to the supporting net by means of pellicles resulting from spraying the granule layer with an aqueous dispersion or a solution of the thermoplastic polymer employed; the liquid is sprayed from above under a convenient pressure, the operation being successively repeated, beginning from one edge of the strip towards the other; it was found convenient to employ dispersions with 20 – 30%, preferably 25%, of solid synthetic resin, or 12 – 23% of the resin, preferably 17%, in solution; with the above concentration the dispersion or the solution trickles down from the prominent portions of the granules in sufficient quantity to the body of the layer of granules and to the support so as to ensure the covering of the whole surface of the granules and their solid binding; the volume of dispersion or of solution sprayed is thus a volume which supplies a small excess beyond that which is returned by the granules layer;

drying the sprayed binder by evaporating the water from the dispersion or the solvent of the solution by moderately heating the layer step by step and uniformly, followed by sintering to transform the binder into a pellicle and then by its slight softening; these operations are favorably performed by infrared heating from below by means of infrared rays of the foil of material to a final temperature of 80°–120° C. For this purpose, the foil of material must be borne and not drawn on a conveyor belt with large meshes, for instance, of wire net; the water vapor being evacuated and the solvent vapor recovered;

detaching the foil of material with the binder in the form of pellicles and softened from the conveyor belt; the operation is advantageously performed by intercalating a roll of small diameter, over the conveyor belt, the roll rotating so as to contribute to the displacement of the foil of material;

pressing the hot foil with the binder softened for the purpose of reaching the final compression and increasing the adhesion of the hard granules to each other and to the supporting net as well as for calibrating the material thickness. This purpose may be easily achieved by drawing the material and letting it pass between two smooth rolls;

cooling the material to ambient temperature, removing the residual water vapor or the gases of gel-formation and polymerization still contained in the material. This cooling process may be conveniently and actively performed on the face of the material which lies on the supporting net, by putting this face in contact with a plane and smooth surface, water cooled, along which the foil of material may be drawn; a cold air draft is blown along the upper face of the material in a direction opposite to the displacement of the foil over the entire zone which is water cooled below;

wrapping the cooled material on cardboard rolls; rolls of 10 – 15 cm in diameter may be employed, the length of the foil wrapped on it being 5 – 20 m;

storing the rolls of material; it was found necessary to store the rolls in vertical positions in order to avoid tractive stress in the material in the longitudinal direction of the foil as a consequence of the plastic strain of the binder which would result in the loss of the hard grain adhesion.

The material for finishing and decorating the buildings, according to the invention — as manufactured by means of a process and the installation described above — looks like a split natural crystalline stone consisting of granules of the same kind and color, or differing, bound by means of a practically invisible binder of organic polymer; it has the appearance of a rugged surface, the granules being prominent at different levels as if the respective stone would have broken according to a scheme which crushes the binder and leaves untouched the granular structure of the stone. Thus the material according to the invention keeps the natural appearance of the granules unchanged as well as their specific effect on light, possibly due to their different nature and to their situation at different planes. The material made with artificial granules — organic or inorganic — shows similar properties and new optical and decorative effects.

The material according to the invention shows a resistance to wear and bad weather corresponding to that of the natural or artificial granules employed. Applied to a building these materials may be impermeable to water, permeable to air and water vapor, of great durability and require little maintenance. These properties render the material for finishing and the inner and outer decoration of any kind of construction.

The material is adequately used in the shape of a wide and long foil with sufficient flexibility as to be manipulated in rolls. The foils may be of a large diversity according to the nature of the granules, their size, color and geometry of arrangement. When applying it, the foil, possibly cut into strips or plates, is applied with its back side to the components of the buildings such as walls, columns, ceilings, floors of plastered concrete, plastered brick masonry, wood, glass, gypsm, smooth faced stone. The foil is fixed by means of cement mortar, cement and lime, with or without additives, such as binders of synthetic resins which may be emulsified with water.

SPECIFIC DESCRIPTION AND EXAMPLES

Figure 1:
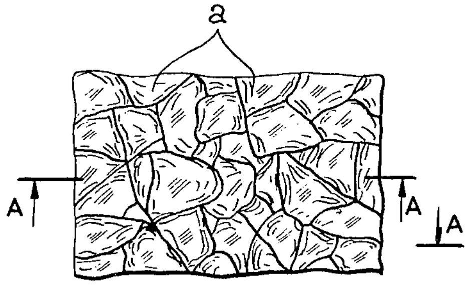
FIG. 1 is a frontal view of the material.
Figure 2:
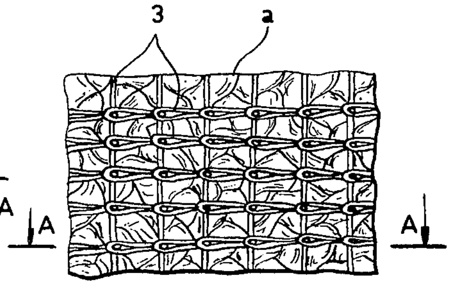
FIG. 2 is a back view of the material.
Figure 3:
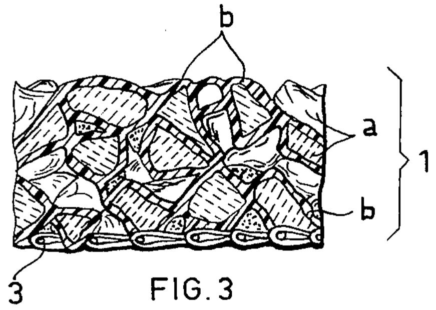
FIG. 3 is a cross-section through the material along the line A—A.

One embodiment of the invention according to FIGS. 1 – 3 shows the material consisting of:

face layer 1 composed of a sheet of hard granules *a*, of white marble, broken, washed, dried and dimensionally sorted;

the binder 2, a thermoplastic synthetic resin, binding the granules of the layer, by means of a film, to each other and to the supporting net 3;

the pellicles of binder film *b* are visible;

the supporting net 3 employed is a cottom thread knitting, with meshes of fixed dimensions;

the knitting has been impregnated;

when manufacturing the material, with an aqueous dispersion, for instance, for polyvinyl acetate (polymer of average viscosity, of 8,000 – 10,000 cP, and a value of K, equal to 70 – 75) fillerized with marble dust of less than 0.2 mm grain.

The layer of granules contains an average of about 2.5 layers of granules *a*, the range of sizes being narrow. Part of the granules penetrate with their corners through the meshes of the bearing net 3.

Figure 4:
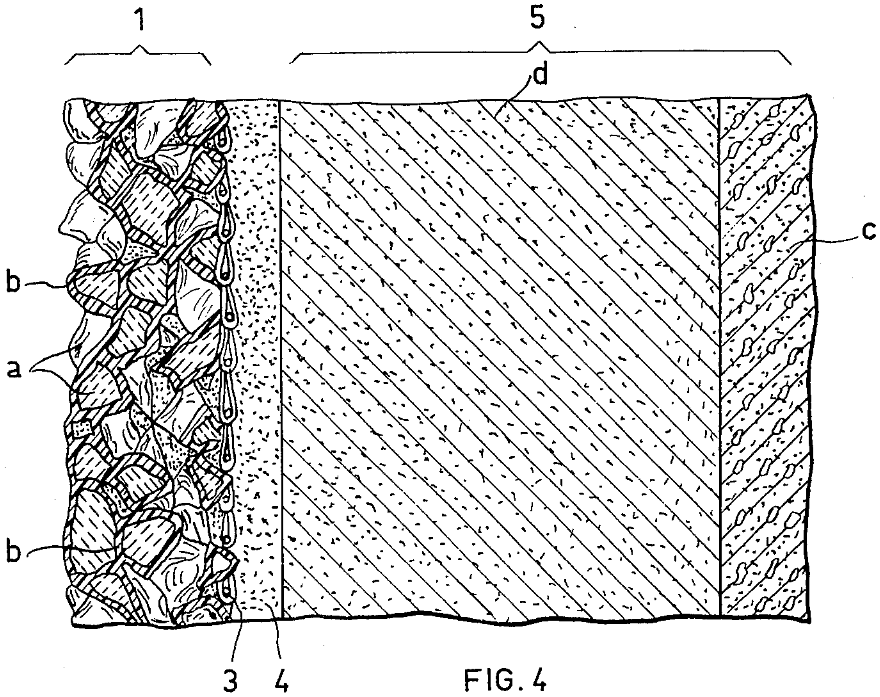
FIG. 4 is a section through the material applied by means of a layer of adhesive mortar to a components of the building.

The material has been applied, according to FIG. 4 by means of the adhesive mortar 4, to the building component 5, for instance, a reinforced concrete wall *c*, the layer of plastering being *d*, and the mortar of lime with cement as an additive.

The adhesive mortar 4 has been prepared according to the followinggrecipe: cement of high initial strength, 1.5 parts; fine dry san, 0 – 0.2 mm grain size, 2 parts; lime paste 50%, the balance consisting in: water 0.10 parts; solid calcium chloride, 0.01 parts; mineral dye, in the hard granules color, in the present example, zinc white, 0.05 parts; polyvinyl acetate, in 50% water dispersion, 0.15 parts; water, up to 0.5 parts (all parts, expressed in weight figures). With this adhesive mortar, the material is firmly affixed to the building component.

The material is rendered water repellent after having been applied to the building component, by spraying polyvinyl chloride and acetate solved by cyclo-hexanone, over the face layer 1.

EXAMPLE 1

The installation for manufacturing the material for building and decoration, object of this example, is a continuous working one, and may produce material with the face layer of granules of the same kind or of different kinds, of the same color or of different colors, uniformly or non-uniformly mixed, before using applied, with the binder in acqueous dispersion or in solution, and the supporting net impregnated or non-impregnated.

Figure 5:
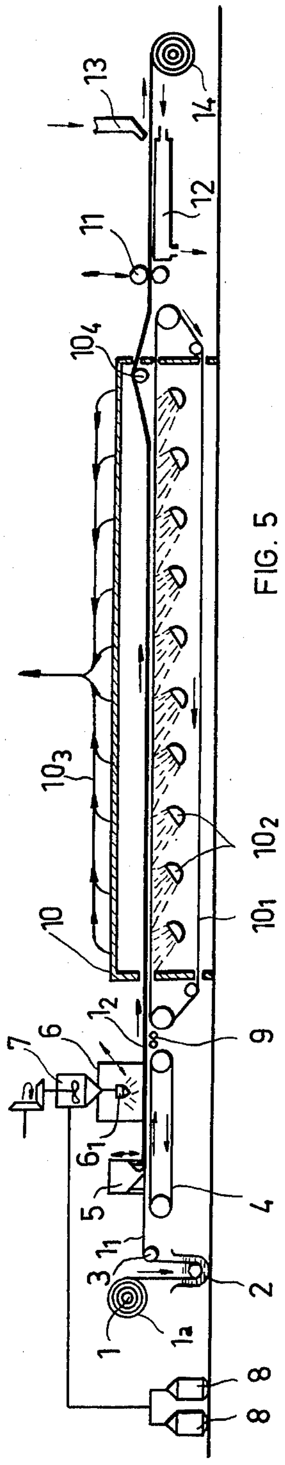
FIG. 5 is a schematic side view of an installation for making the material.
Figure 6:
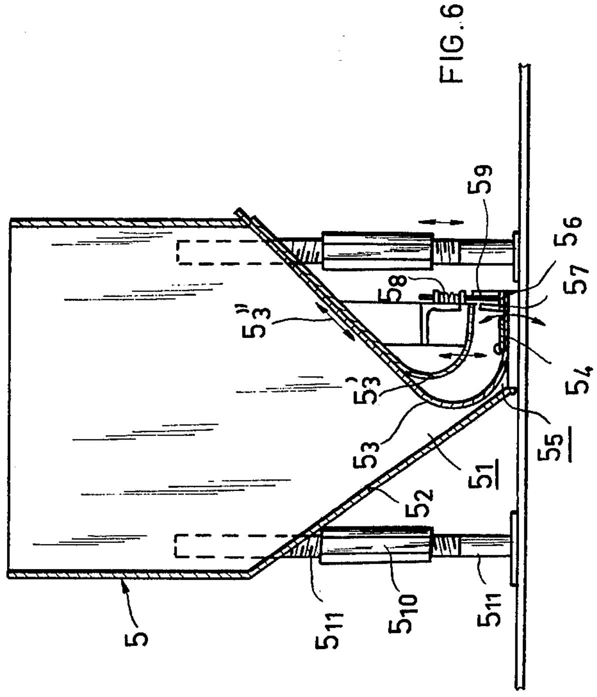
FIG. 6 is a cross-section through the feed-dosing device of the installation.

In an adequate execution, the installation consists of the following parts, according to the diagrammatic sketches in FIGS. 5 and 6, while its operation is described further down:

The unreeling device 1, bearing on its shafts the supporting net roll $1_1$. The device unreels by traction and goes over the smooth roll in the baiting, or priming vat 2, which is filled with the baiting or priming liquid, maintained at a constant level (the liquid is an aqueous dispersion or solution of the polymer used, eventually with powder of the hard granules material of the fact layer, as a filler); when the supporting net requires no priming, it by-passes vat 2, going directly over the small diameter guiding and squeezing roll 3, of small diameter, provided with helical ribs arranged in opposite directions, from the center towards the ends; the directions of the ribs are such, that when roll 3 rotates, it extends the supporting net laterally, and if the latter is primed squeezes out the priming liquid in excess, which is then led back to vat 2. The supporting net is then taken over by the conveyor belt 4 which drags it, at the same time exercising the tractive power, necessary for the unrolling, priming, guiding and squeezing operations, mentioned above. The conveyor belt is driven by a motor-reducer-variator set for the steples speed variation.

From the feeding-dosing device 5, continuously supplied over its whole length with hard granules, previously washed and dried, the granules are continuously distributed, transversely and simultaneously, over the whole width of the supporting net; the granules flow through the opening $5_1$, which gets continuously narrower, between the fixed plain and sloping wall $5_2$, and the cylindrically bent wall $5_3$, which may glide (in the direction shown by arrow $5_3''$) along the bent wall $5_3'$; the lower end of the wall $5_3$ is tangent to a plane, parallel to that of the conveyor belt 4, the free end of the wall $5_3$ may be driven by means of the free flap $5_4$, of horizontal axis; the position of the flap $5_4$ may be fixed; the position of the gliding wall $5_3$ and of the flap $5_4$ serve for the rough, respectively fine adjustment of slit $5_5$, and consequently of the hard granule dosing; in continuation of the gliding wall $5_3$, there is the horizontal scraper blade $5_6$, borne by the support $5_7$, both being elastically maintained by means of the springs $5_8$, which surround the bolts $5_9$. The whole device is provided for its vertical displacement, by means of the double thread bushings $5_{10}$, mounted on the legs $5_{11}$ of the device. The scraper blade $5_6$ levels the thickness of the "rough surface" granules layer distributed over the supporting net $1_1$, which later becomes the material foil $1_2$.

The device 6 sprays over the granule layer on the supporting net $1_1$, driven by conveyor belt 4, an aqueous dispersion or a solution of synthetic resins, which flows by bravity from the tank 7 provided with a stirrer, which is located above, being supplied at regular intervals with fresh liquid, from one of the monte-jus 8, by means of compressed air. The liquid is sprayed downwards atomized with compressed air, simultaneously, by the battery of nozzles $6_1$, uniformly distributed over a rectangular area, supplied individually with liquid from the tank 7, and still individually with compressed air, over flexible hoses; the battery of nozzles has an adjustable spraying output and is borne by a trolley, running on rails in both directions, transversely with respect to the strip of foil; the motion is transmitted over chain wheels and chains, by means of a motor-reducer-variator set and an automatic reversing switch.

The foil of material $1_2$, sprayed with liquid, goes over the rolls 9 in the drying tunnel 10, where it is covneyed by the conveyor belt $10_1$, made of larger mesh wire net, driven by a motor-reducer-continuous speed variator set, the speed being synchronized with that of conveyor belt 4. The foil of material is heated by means of gas-fired infrared heaters $10_2$, located below, whose ranges of radiation cover the whole length and width of the strip of material within the tunnel, ensuring a step by step, moderate and uniform heating, to evaporate completely the liquid sprayed and to have the foil, when leaving the tunnel, at a temperaure of 80°–120° C. The binder used is thus transformed into pellicles and slightly softened; the system of pipes $10_3$ evacuates the water vapor upwards to the atmosphere, and the solvent vapors to the condenser. The roll $10_4$ is located inside the tunnel, at the exit of the foil of material, immediately above the conveyor belt $10_1$, being smooth and of small diameter, and being rotated in the direction of displacement of the foil of material, at an adjustable tangential speck, equal to that of the conveyor belt $10_1$; the roll detaches the foil of material, with the binder in the shape of a film, softened, from the conveyor belt $10_1$, the foil going between the pair of free and smooth roll 11, to be pressed, finally compacted and its thickness gauged.

After having passed the rolls 11, the foil of material is cooled, gliding over the water cooling table 12, provided with flat box,, with inner baffles and water circulation in counter-current with the foil of material, which is cooled down to the temperature of the surroundings. The foil of material is equally air cooled, over its whole upper surface, by means of the cold air blowing opening 13, blowing tangentially, at the final end of the water cooling table 12, supplied by an air blower.

The foil of material, cooled down to the surrounding temperature, is still flexible, so as to be wound on a cardboard roll of 10–15 cm dia, placed on the shaft of the rolling derive 14, driven by a motor-reducer-continuous speed variator set, which equally drags the strip of material beyond the drying tunnel 10. between the rolls 11, and on the table 12. When the desired length of the roll is reached, the strip is cut manually, and the roll replaced, equally manually.

The whole installation may be automated, the conditions being those already known, and provided with a second, spare roll, as well as with mechanical means for cutting the strip of material, incorporated into the rolling device.

It is understandable that by adequate modification of the feeding-dosing device 5 and of its annexes, as for instance by its transversal division in compartments, by dividing the gliding, cylindrical bent wall regulating the flow, in several sections, corresponding to the compartments, and the control of the respective draining, the bunder being suppled with granules of different nature and color, materials may be obtained with layers of granules, arranged according to the pre-established geometries.

The application of the invention yields the following advantages:

it supplies a material for finishing and decorating the buildings, in the shape of a flexible, continuous strip, constituting a ready finished veneer, having the aspect of a split natural cyrstalline stone, or similar with a wide range of asortments, colors, patterns, of high resistance and good adhesive properties, being a prefabricated material, applicable on outer and inner walls, on ceilings and even on floors, of low cost and application expenses, as compared to the ready finished veneers of plasterings, or other similar material of ceramics, glass etc.,;

the manufacturing process of the finishing and decorating material is simple, using granules of broken or nateral rock, sometimes artificial granules, which are spread as a multi-layer sheet, on a supporting net, bound together and the binder dried, the binder generating pellicles or practically invisible and reduced amounts of polymer;

the manufacturing installation of the finishing and decorating material is simple, not expensive, and of high productivity being susceptible of complete mechanization and automation.

We claim:

1. An apparatus for producing a decorative structural material of the type in which a layer of granules is bonded to one side of a net web and is coated with a transparent synthetic resin covering, said apparatus comprising:

coating means for continuously applying to a web of netting a synthetic-resin primer;

a first conveyor adjacent said coating means for displacing the web of netting coated with said primer away from said coating means;

granule-deposition means above said first conveyor for depositing a layer of mineral granules on the web of netting coated with primer;

spray means above said first conveyor downstream of said granule-deposition means for spraying a transparent synthetic-resin film onto said granules deposited on the primed web of netting;

an elongated heating tunnel downstream of said first conveyor and a second conveyor extending through said tunnel for conveying the web of netting carrying said granules and coated with said film therethrough, said tunnel being provided below said second conveyor with an array of heating elements for drying the web coated with said granules and said film and heating same to a temperature of substantially 80°to 120° C;

a roller for deflecting said web away from said conveyor at a discharge end of said tunnel;

a pair of compaction rolls downstream of said heating tunnel for pressing the film-coated granules compacted together and into said web to form a foil therefrom; and means downstream of said rolls for cooling the resulting foil.

2. The apparatus defined in claim 1 wherein said granule-deposition means include a granule-deposition head and means for displacing said head repeatedly transversely back and forth across said web.

3. The apparatus defined in claim 1 wherein said granule-deposition means comprises a vertically displaceable hopper having a pair of downwardly-converging bottom portions forming a discharge slit, said slitting being inclined downwardly in the direction of movement of said web on said first conveyor and having a closure member swingable about a horizontal axis, said slit being defined by a substantially cylindrical portion of the downstream one of said bottom portions.

* * * * *